Jan. 1, 1924.  
A. R. K. DJURSON  
1,479,701  
SLACK ADJUSTER FOR BRAKES  
Filed Nov. 19, 1921  
2 Sheets-Sheet 1
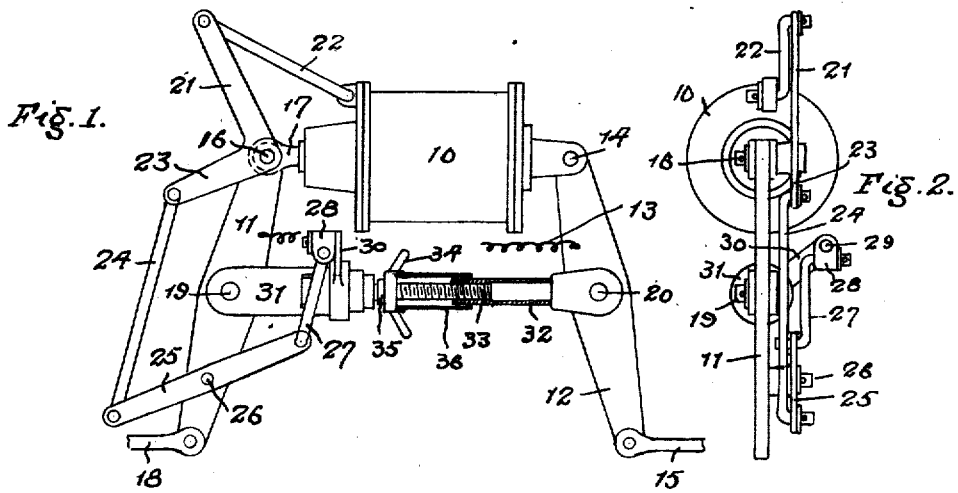
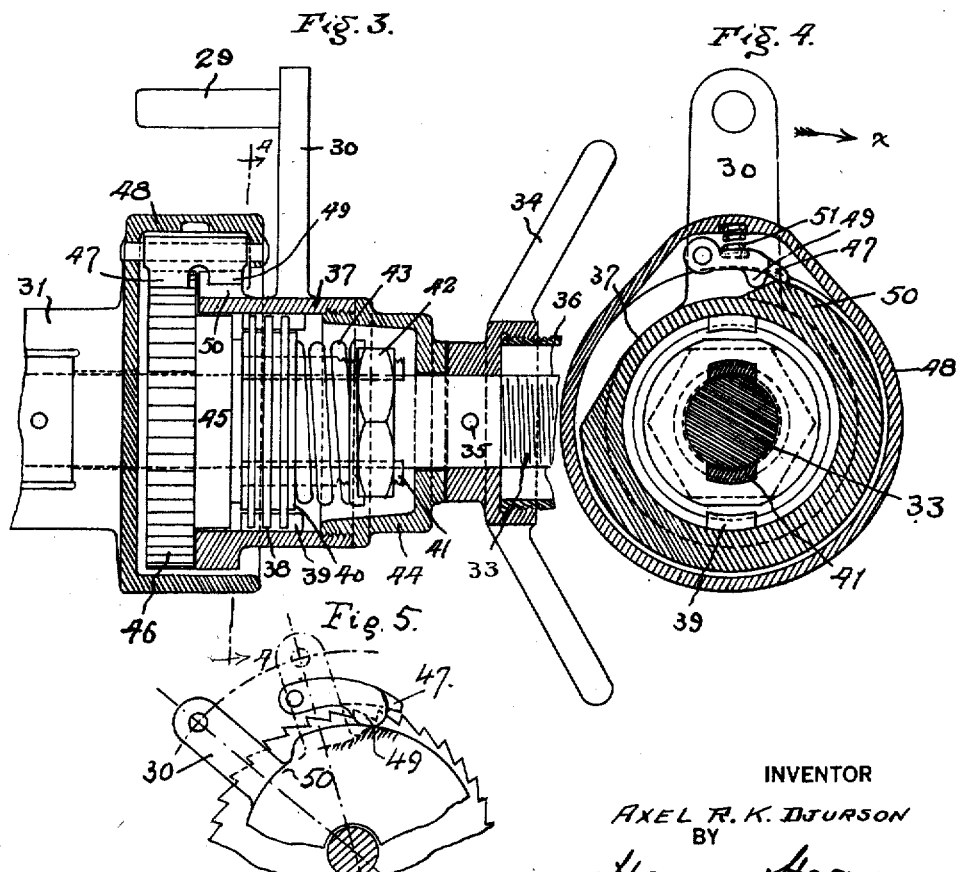
INVENTOR  
AXEL R. K. DJURSON  
BY  
ATTORNEYS Jan. 1, 1924
A. R. K. DJURSON
1,479,701
SLACK ADJUSTER FOR BRAKES
Filed Nov. 19, 1921
2 Sheets-Sheet 2
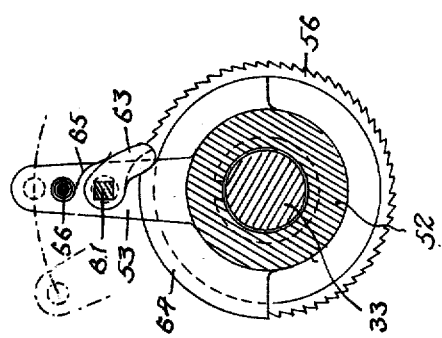
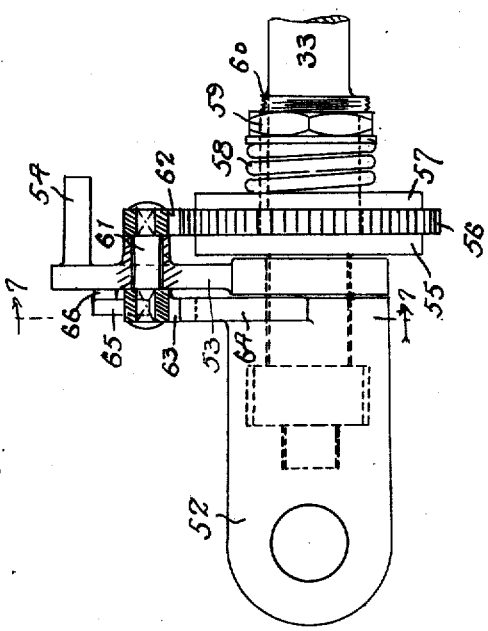
INVENTOR
AXEL R. K. DJURSON
BY
ATTORNEYS Patented Jan. 1, 1924.

1,479,701

UNITED STATES PATENT OFFICE.

AXEL R. K. DJURSON, OF MALMO, SWEDEN.

SLACK ADJUSTER FOR BRAKES.

Application filed November 19, 1921. Serial No. 516,397.

*To all whom it may concern:*

Be it known that I, AXEL RUDOLF KONRAD DJURSON, a citizen of Sweden, and resident of Malmo, Sweden (whose post-office address is Malmo, Sweden), have invented new and useful Improvements in Slack Adjusters for Brakes, of which the following is a specification.

My invention relates to slack adjusters for brakes, and particularly for railway car brakes and the like. The object of my invention is to provide an adjuster having a yielding device which in certain forms of construction operates automatically either to take up excessive slack, (incident, for example, to wear of the brake shoes) or to pay out slack when the brake shoes have been brought closer to the wheels than is desired, (incident, for example, to a heavy loading of the car body with resultant abnormal depression of the brake rigging). So far as known, no slack adjuster has heretofore been provided which is capable of automatically paying out slack to meet this condition.

My invention is illustratively embodied in the construction shown in the accompanying drawings, in which—

Fig. 1 is a side elevation of the brake cylinder and associated portions of the brake rigging in which the adjuster operates both to pay out and to take in slack in the brake rigging;

Fig. 2 is a view at right angles thereto;

Fig. 3 is an enlarged section on the line 3—3, Fig. 1;

Fig. 4 is a section on the line 4—4, Fig. 3;

Fig. 5 is a diagram illustrative of the operation of the adjuster cam;

Fig. 6 is a broken side elevation of portion of an adjuster embodying my invention in a modified form, in which only a take-up of slack in the brake rigging is desired; and Fig. 7 is a section on the line 7—7, Fig. 6.

For the purpose of illustrating the invention, I have associated the present adjusting mechanism with the usual brake cylinder 10, brake levers 11 and 12, normally retracted to inoperative position by a return spring illustrated, for example, at 13, although usually arranged within the cylinder 10. The brake lever 12 is pivoted at 14 to one end of the brake cylinder 10, while its other end is connected by the brake rod 15 to the brake shoe gearing, not shown. The lever 11 is pivoted at 16 to the piston rod 17, at one end, and at the other end is connected by the brake rod 18 to a second brake shoe gearing, not shown. Extending between the brake levers 11 and 12 and pivoted thereto at 19 and 20, is the adjuster mechanism to which the invention particularly relates.

The adjuster operating rigging comprises a bell crank lever pivoted at 16 at the end of the piston rod 17, and having its arm 21 anchored by the link 22 to the adjacent cylinder head, or at some other suitable place. The arm 23 is connected by link 24 to the rock lever 25 pivoted at 26 on the brake lever 11 and connected by link 27 and strap 28 to the crank pin 29 of the operating crank arm 30 of the adjuster.

The adjuster comprises at one end a socket member 31, anchored by the pivot 19 to the brake lever 11. At its other end a tubular nut 32 is anchored by the pivot pin 20 to the brake lever 12. The nut 32 is threaded to receive the adjusting screw 33, the head of which freely swivels in the socket 31. It is thus clear that by rotating the screw 33 the relative position of the brake levers 11 and 12 may be adjusted and the spacing of the brake shoes from the wheels thus determined. A wing nut 34 is pinned at 35 to the adjusting screw 33 by which the latter may be manually rotated, when the brake rigging is installed, to set the brake shoes at the desired spacing from the wheels. A shield 36 carried by the nut 34 sleeves over the tubular nut 32 and protects the parts from dirt and rain. The position of the wing nut 34 on the screw 33 is immaterial, but is such as to permit considerable play of the screw in the tubular nut 32.

Arranged between the wing nut 34 and the socket 31 is the adjuster sleeve 37, which carries the adjuster operating crank 30. Encased within this sleeve is a friction clutch, the discs 38 of which slide on ribs 39 on the inner face of the sleeve 37. The cooperating discs 40 slide on keys 41 held in longitudinal channels in the adjusting screw 33 by a nut 42 which also forms the abutment for one end of the clutch coil spring 43. The sleeve 37 is carried by a bearing head 44 at one end, which freely journals on the plain shank of the screw 33. At its other end the sleeve is supported by a bearing hub 45 fast with the screw 33 and formed in one with a ratchet disc 46. Adapted to engage the ratchet disc 46 is a detent pawl 47 pivoted on the bell end 48 of the fixed socket 31 and having an associated lifting stud 49 lying to one side of the ratchet disc 46. Cooperating with the lifting stud 49 is a cam 50 on the exterior of the sleeve 37, said cam, in certain positions of the sleeve, engaging the stud 49 to lift the pawl 47 against the action of its spring 51 and out of engagement with the ratchet disc 46. In normal position, that is to say, when the brake is in its initial position (Fig. 5), the cam is in engagement with the stud 49 and holds the pawl in lifted or disengaged position.

The operation of the device is readily understood. Assuming the adjuster to be so regulated that the proper spacing between the brake shoes and the wheels is afforded, then upon the application of braking pressure the outward movement of the piston rod 17 actuates the adjuster rigging 21, etc., and causes the crank 30 of the cam sleeve 37 to rotate (in the direction of the arrow X, Fig. 4) through an arc of such extent that the cam 50 moves out of engagement with the lifting stud 49 at the moment the brake shoes are applied to the wheels. During this period the clutch causes the screw 33 to rotate in the nut 32. The moment, however, that braking strain is placed upon the levers 11 and 12 by the application of the brake shoes against the wheels, the screw 33 is locked by the friction moment between the threads of the screw and of the tubular nut 32. Consequently, any further rotation of the crank arm 30 and sleeve 37, incident to the further outward movement of the piston 17 during the application of braking pressure, causes slippage in the friction clutch 38—40. The screw 33 consequently remains stationary during this further period of rotation of the sleeve 37. On the return movement of the piston, the friction moment which locks the screw 33 is not released before the brake shoes leave the wheels, at which instant the cam 50 has returned to the position in which it engages the lifting stud 49 and again moves the pawl 47 and holds it out of engagement with the ratchet 46. The screw 33 is reversely rotated by the clutch connection, to the same extent as it was rotated during the initial movement of the piston on the admission of braking pressure to the cylinder 10, and there is consequently no change in the position of the adjuster parts.

Should the spacing of the brake shoes from the wheels be greater than that predetermined, however, then on the admission of pressure to the cylinder 10 and the outward movement of the piston 17, the sleeve 37 will be caused to rotate through a greater arc than normal before the brake shoes are applied to the wheels. Consequently, the detent pawl 47 is dropped by the cam 50 into engagement with the ratchet disc 46 before the screw 33 is locked by the friction moment exerted by the application of brake shoes to the wheels. On the return movement, the friction lock on the screw 33 is released by the movement of the brake shoes from the wheels, before the cam 50 raises the pawl 47 from the ratchet 46. But, inasmuch as the ratchet is rigid with the screw 33 and is still detained by the pawl 47, the cam sleeve 37 rotates with relation to the screw, through the slippage in the clutch, until the cam 50 lifts the pawl. The completion of the return movement rotates the screw, but to an extent less than that which it was rotated on the application of braking pressure. Consequently, the initial position of the screw with relation to the nut 32 is altered, and the excess clearance of the brake shoe reduced.

Should the distance between the brake shoes and the wheels be less than that desired, the shoes are applied to the wheels before the cam 50 has traveled a sufficient arc to drop the detent pawl into engagement with the ratchet. The screw is at once locked by the friction moment and the cam sleeve, slipping on the clutch, travels its required arc during the application of braking pressure. On the return stroke, the release of tension in the system from the wheels occurs after the cam has lifted the pawl. There is, however, a slight lost motion (intentional or unintentional) in the adjuster rigging 21—28. Consequently, on the admission of pressure to the brake cylinder, the piston moves a slight distance before the crank 30 begins to rotate. This lost motion is taken up in similar manner at the beginning of the return stroke. The return travel of the crank 30 after the friction lock on the screw has been released, is greater therefore, than its travel during the braking action and before the friction lock becomes effective. This slight additional arc of travel on the return stroke of the crank is sufficient to effect a slight additional rotation of the screw in a direction to pay out slack, thus increasing the clearance between the brake blocks and the wheels. If the car is gradually loaded at successive stops, this automatic pay-out slack is sufficient to maintain the brake shoes in proper position, in spite of the change of position of the brake rigging with respect to the wheels, incident to the depression of the car body toward the trucks as the load increases. If the car starts with a heavy load, the operator has merely to operate his control lever two or three times before starting travel to insure the proper position of the brake shoe. This is an operation which occupies but a few moments, and is one which is ordinarily practiced by engineers in standard systems to assure themselves that the brakes are in proper working condition.

In the construction above described, the adjuster automatically takes up or pays out slack, as the case may be, by means of the yielding operative connection and coacting relation of parts set forth. It is also possible to utilize this form of yielding connection in an arrangement which affords only a slack take-up action. This is illustrated in Figs. 6 and 7.

In this form, the socket member 52, corresponding to the member 31 of the construction shown in Figs. 1 to 4, receives, as in that construction, the swiveling end of the take-up screw 33. Mounted freely on the screw 33 adjacent the socket 52, is the crank arm 53 with crank pin 54 for connection to the adjuster operating rigging, as in the construction first described. Adjacent the crank on the other side of the latter is an abutment disc 56 rigid with the screw 33. Juxtaposed thereto, but free on the screw, is a ratchet 56 which is pressed against the abutment disc 55 by the clutch disc 57 splined to the screw 33 and engaged by the clutch spring 58. The tension of the latter is regulated by the nut 59 screwing on the threaded portion 60 of the screw 33. Carried freely by the crank arm 53 is a spindle 61 which has fast at one end a pawl 62 cooperating with the ratchet wheel 56, while a lifting stud 63 is fast on the other end of the spindle and rides the cam flange 64 is formed on the end of the socket 52 adjacent the crank arm 53. The spring 65 mounted on the stud 66 on the crank arm tends constantly to press the stud 63 downward and thus to bring the pawl 62 into engagement with the ratchet disc 56.

In its initial position the crank arm 53 is located as indicated in dotted lines in Fig. 7, in which position the stud 63 rides the cam 64 and the pawl 62 is lifted out of engagement with the ratchet wheel 56. The extent of the cam 64 is such, however, that after predetermined arcuate movement of the crank arm 53 the stud 63 overruns the end of the cam and permits the pawl to drop into engagement with the ratchet wheel 56. The arm through which the crank arm thus travels prior to the drop of the pawl into engagement with the ratchet, is predetermined to coincide with that desired for the movement of the rigging prior to the engagement of the brake shoe with the wheels. If the spacing of the shoes from the wheels be correct, they are applied coincident with the drop of the pawl into engagement with the ratchet. During the continued rotation of the crank arm 53 the ratchet wheel 56 rotates with respect to the friction disc 57. On the return movement of the crank arm after braking pressure is released, the pawl 62 rides the ratchet teeth, since the ratchet disc 56 is held against rotation by the clutch 7. No motion is therefore imparted to the screw 33.

Should the spacing of the brake shoes from the wheels be too great, however, then the pawl 62 drops into engagement with the ratchet 56 before the braking pressure locks the screw 33, and during the interval between the drop of the pawl into engagement with the ratchet and the locking of the screw by the tension in the brake system, the screw is rotated with the ratchet 56 by reason of the engagement of the ratchet disc between the abutment plate 55 and the clutch disc 57. On the return movement of the crank arm the pawl 62 rides the ratchet teeth as before. The screw 33 is thus rotated slightly in the nut 32 (Fig. 1) in a direction to vary slightly the spacing of the levers 11 and 12, and thus afford a take-up of the excessive slack between the shoes and the wheels.

In both types of construction, viz., Figs. 1-5 and Figs. 6-7, the ratchet and pawl mechanism operates as a one-way stop. It is a convenient device for this purpose, but by no means the only one. It may be substituted, for example, by a brake cam, a band, bolt or other clutch device, or other equivalents, and my invention and claims are to be interpreted in a manner sufficiently comprehensive to include such modifications.

As previously stated, the particular arrangement of the slack adjuster rigging and the point at which it is installed in the brake operating system may be varied while still accomplishing the desired result. The constructions shown are therefore to be regarded as merely illustrative of what I claim as my invention.

I claim—

1. In a slack adjuster for brakes, an adjuster screw, a movable member connected to the brake mechanism, and moving therewith, an operative connection between said member and the screw for rotating the screw in opposite directions on opposite strokes of said movable member, and means for rendering said operative connection ineffective during portion of the stroke of said movable member in one direction and in predetermined position of the parts.

2. In a slack adjuster for brakes, an adjuster screw, a movable member connected to the brake mechanism and moving therewith, an operative connection between said member and the screw for rotating the screw in opposite directions on opposite strokes of said movable member, and cam controlled means for rendering said operative connection ineffective during portion of the stroke of said movable member in one direction and in predetermined position of the parts.

3. In a slack adjuster for brakes, a movable member connected with lost motion to the brake mechanism and moving therewith, an adjuster screw, and an operative connection between said screw and movable member for rotating the screw in both directions on the operation of the brake.

4. In a slack adjuster for brakes, an adjuster screw, a lever for imparting rotation thereto, a yielding member in the operative connection between the lever and the screw, a ratchet member, a pawl cooperating therewith, and means governed by the position of the lever for determining the engagement of the ratchet by the pawl and the rotation of the screw through said yielding member.

In testimony whereof I have signed my name to this specification.

AXEL R. K. DJURSON.